US010789171B2

(12) United States Patent
Li

(10) Patent No.: US 10,789,171 B2
(45) Date of Patent: Sep. 29, 2020

(54) INFORMATION PROCESSING METHOD AND DEVICE, AND METHOD AND DEVICE FOR DISPLAYING DYNAMIC INFORMATION

(71) Applicant: Alibaba Group Holding Limited, George Town (KY)

(72) Inventor: Qucheng Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/210,347

(22) Filed: Dec. 5, 2018

(65) Prior Publication Data

US 2019/0108129 A1 Apr. 11, 2019

Related U.S. Application Data

(63) Continuation of application No. PCT/CN2017/085654, filed on May 24, 2017.

(30) Foreign Application Priority Data

Jun. 6, 2016 (CN) .......................... 2016 1 0393580

(51) Int. Cl.
*G06F 12/0871* (2016.01)
*G06F 16/957* (2019.01)
(Continued)

(52) U.S. Cl.
CPC .......... *G06F 12/0871* (2013.01); *G06F 12/04* (2013.01); *G06F 12/0886* (2013.01); *G06F 16/9574* (2019.01)

(58) Field of Classification Search
CPC ............. G06F 12/0871; G06F 16/9574; G06F 3/0659; G06F 12/04
See application file for complete search history.

(56) References Cited

U.S. PATENT DOCUMENTS 5,335,224 A * 8/1994 Cole ................... H04L 12/5602
370/235
6,058,389 A 5/2000 Chandra et al.
(Continued)

FOREIGN PATENT DOCUMENTS

| CN | 1869979 | 11/2006 |
|----|---------|---------|
| CN | 1881899 | 12/2006 |

(Continued)

OTHER PUBLICATIONS

Gerd Wagner, Java Back-End Web App Tutorial Part 1: Building a Minimal App in Seven Steps, Code Project, Nov. 20, 2015, https://www.codeproject.com/Articles/1057613/Java-Back-End-Web-App-Tutorial-Part-Building-a-Min (Year: 2015).*

(Continued)

*Primary Examiner* — Ryan Bertram
*Assistant Examiner* — Edmund H Kwong
(74) *Attorney, Agent, or Firm* — Fish & Richardson P.C.

(57) ABSTRACT

A plurality of types of user data are collected and stored into a plurality of data queues, where each data queue of the plurality of data queues has a predetermined maximum length and stores one type of user data. A weighting coefficient and a current length of user data is determined for each data queue. A priority data queue is selected from the plurality of data queues based on the weighting coefficient and the current length of user data corresponding to each data queue. The priority data queue is written to a data buffer.

18 Claims, 11 Drawing Sheets

(51) Int. Cl.
*G06F 12/04* (2006.01)
*G06F 12/0886* (2016.01)

(56) References Cited

U.S. PATENT DOCUMENTS

| | | | |
|---|---|---|---|
| 7,774,571 | B2 | 8/2010 | Benhase et al. |
| 8,261,029 | B1 * | 9/2012 | Marshak ............... G06F 3/0613 |
| | | | 370/444 |
| 8,462,789 | B2 | 6/2013 | Sobaje |
| 9,098,525 | B1 * | 8/2015 | Mandic ................. G06F 16/182 |
| 2002/0122422 | A1 | 9/2002 | Kenney et al. |
| 2011/0302373 | A1 * | 12/2011 | Ito ............................. G06F 7/02 |
| | | | 711/140 |

FOREIGN PATENT DOCUMENTS

| | | | |
|---|---|---|---|
| CN | 102740367 | | 10/2012 |
| CN | 104243581 | | 12/2014 |
| CN | 105354258 | | 2/2016 |
| TW | 201541930 | | 11/2015 |
| WO | WO-2006092089 | A1 * | 9/2006 .......... H04M 3/5233 |

OTHER PUBLICATIONS

Samira Khan et al. Improving Cache Performance by Exploiting Read-Write Disparity, 2014 (Year: 2014).*
Machine translation of Kang 2006 (Year: 2006).*
European Extended Search Report in European Application No. 17809631.9, dated Apr. 5, 2019, 7 pages.
International Search Report by the International Searching Authority issued in International Application No. PCT/CN2017/085654 dated Aug. 31, 2017; 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Cao, "Research and Application on Integration of Web Data Cache and Prefetch," Apr. 2013, China Master's Thesis Full-Text Database Information Technology, 77 pages (with English abstract).

* cited by examiner

INFORMATION PROCESSING METHOD AND DEVICE, AND METHOD AND DEVICE FOR DISPLAYING DYNAMIC INFORMATION

CROSS-REFERENCE TO RELATED APPLICATIONS

This application is a continuation of PCT Application No. PCT/CN2017/085654, filed on May 24, 2017, which claims priority to Chinese Patent Application No. 201610393580.4, filed on Jun. 6, 2016, and each application is hereby incorporated by reference in its entirety.

TECHNICAL FIELD

The present application relates to the field of Internet technologies, and in particular, to an information processing method and device, and a method and device for displaying dynamic information.

BACKGROUND

With the development of Internet technologies, many Internet financial solutions appear. An Internet financial solution is Internet crowdfunding. After a user accesses an Internet crowdfunding page, with respect to a crowdfunding project, dynamic information of the project is displayed, such as ongoing funding project, browsing information, social information, and transaction information.

In related technologies, after being generated, the dynamic information is directly written into a cache by an information generation module. For example, a user interface directly writes the browsing information and the social information into the cache, and a transaction service module directly writes the transaction information into the cache.

Because the generated dynamic information can include a large amount of data, especially the browsing information, a large number of writing operations may need to be performed on the cache. However, it is preferable to have a small quantity of write operations and a large quantity of read operations performed on the cache. When there is excessive writing pressure performed on the cache, cache performance is affected.

Further, for each project, only several pieces of the latest information are cached, and when the user interface reads information from the cache for display, relatively new information is displayed. Because a more frequent behavior of the user is browsing, the relatively new information in the cache is usually the browsing information. Correspondingly, the browsing information is usually displayed, and the social information and the transaction information are submerged. However, information that is more valuable to a user for reference is the social information and the transaction information, therefore, displayed information is less valuable, and highly valuable information cannot be displayed.

SUMMARY

The present application intends to resolve one of the technical problems in related technologies at least to a certain extent.

Therefore, a purpose of the present application is to provide an information processing method and device.

To achieve the previous objective, an implementation of the first aspect of the present application provides an information processing method. The method includes determining an information category that needs to be updated; and writing information of the determined category into a cache, where after being received, the information of the category is stored in a storage space corresponding to the category based on the category of the information.

To achieve the previous objective, an implementation of the second aspect of the present application provides an information processing device. The device includes a determining module, configured to determine an information category that needs to be updated; and a writing module, configured to write the information of the determined category into a cache, where after being received, the information of the category is stored in a storage space corresponding to the category based on the category of the information.

To achieve the previous objective, an implementation of the third aspect of the present application provides a method for displaying dynamic information. The method includes obtaining the dynamic information from a cache of a server; and displaying the dynamic information, where the dynamic information is related to an information category.

To achieve the previous objective, an implementation of the fourth aspect of the present application provides a device for displaying dynamic information. The device includes an acquisition module, configured to obtain dynamic information from a cache of a server; and a display module, configured to display the dynamic information, where the dynamic information is related to an information category.

To achieve the previous objective, an implementation of the fifth aspect of the present application provides an information processing device. The device includes a processor and a memory. The memory is configured to store an instruction that can be executed by the processor. The processor is configured to determine an information category that needs to be updated; and write information of the determined category into a cache, where after being received, the information of the category is stored in a storage space corresponding to the category based on the category of the information.

To achieve the previous objective, an implementation of the sixth aspect of the present application provides a device for displaying dynamic information. The device includes a processor and a memory. The memory is configured to store an instruction that can be executed by the processor. The processor is configured to obtain the dynamic information from a cache of a server; and displaying the dynamic information, where the dynamic information is related to an information category.

To achieve the previous objective, an implementation of the seventh aspect of the present application provides an information processing system. The system includes a collection device, configured to receive dynamic information generated by a front end interface; a message device, configured to receive dynamic information generated by a back end server; a service device, configured to receive the dynamic information sent by the collection module and the dynamic information sent by the message module, store the dynamic information in a storage space corresponding to a category based on the category that includes the dynamic information, and write the dynamic information of the determined category into the cache when the cache needs to be updated; and a caching device, configured to receive the dynamic information written by the service module.

The technical solutions provided in the implementations of the present application have the following beneficial effects:

The information of the determined category is written into the cache, so that highly valuable information can be selected and written into the cache. When reading information from the cache and displaying the information, the user interface can display the highly valuable information.

Further, instead of writing the information into the cache directly when the information is generated, the information is written into the cache only when current time arrives at the scheduled time for updating the cache, so that a quantity of writing times can be reduced, thereby reducing writing pressure of the cache and improving cache performance. Moreover, information sent by the information generator is stored, so that information precipitation can be implemented and data support can be provided for a related procedure.

Some additional aspects and advantages of the present application provided in the following descriptions are evident in the following descriptions, or are understandable through implementing the present application.

BRIEF DESCRIPTION OF DRAWINGS

The previous and/or additional aspects and advantages of the present application are apparent and comprehensible in the following descriptions of implementations with reference to the accompanying drawings.

DESCRIPTION OF IMPLEMENTATIONS

Figure 1:
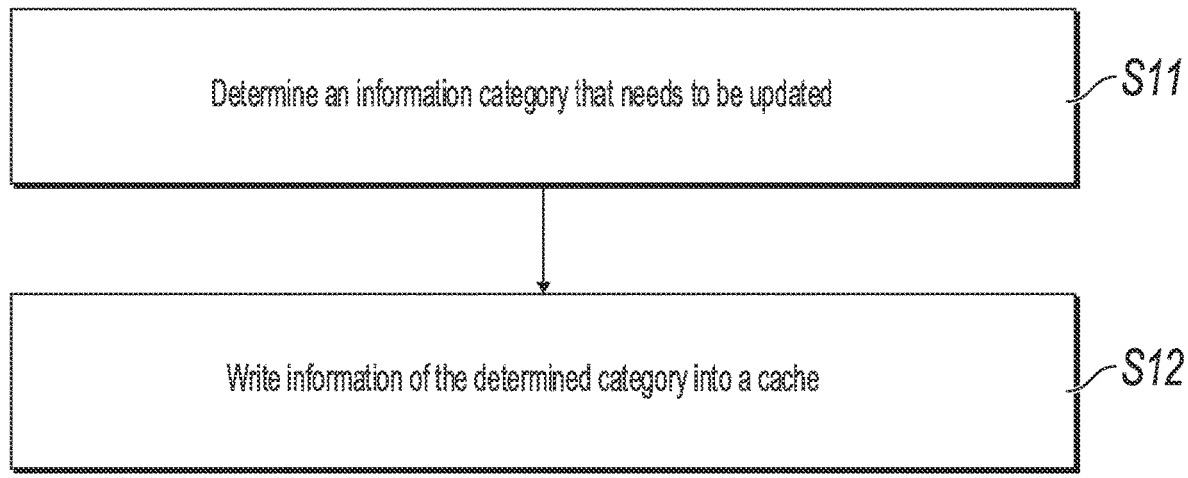
FIG. 1 is a schematic flowchart illustrating an information processing method, according to an implementation of the present application.

The implementations of the present application are described in detail below, and examples of the implementations are shown in the accompanying drawings. The same or similar reference numerals represent the same or similar modules or modules having the same or similar functions. The implementations described below with reference to the accompanying drawings are exemplary; merely intended to explain the present application, and should not be construed as a limitation on the present application. Moreover, the implementations of the present application include changes, modifications and equivalents falling within the spirit and connotation scope of the appended claims.

FIG. 1 is a schematic flowchart illustrating an information processing method, according to an implementation of the present application.

Referring to FIG. 1, the method in the present implementation includes the following steps:

S11. Determine an information category that needs to be updated.

S12. Write information of the determined category into a cache.

After being received, the information of the category is stored in a storage space corresponding to the category based on the category of the information.

Figure 2:
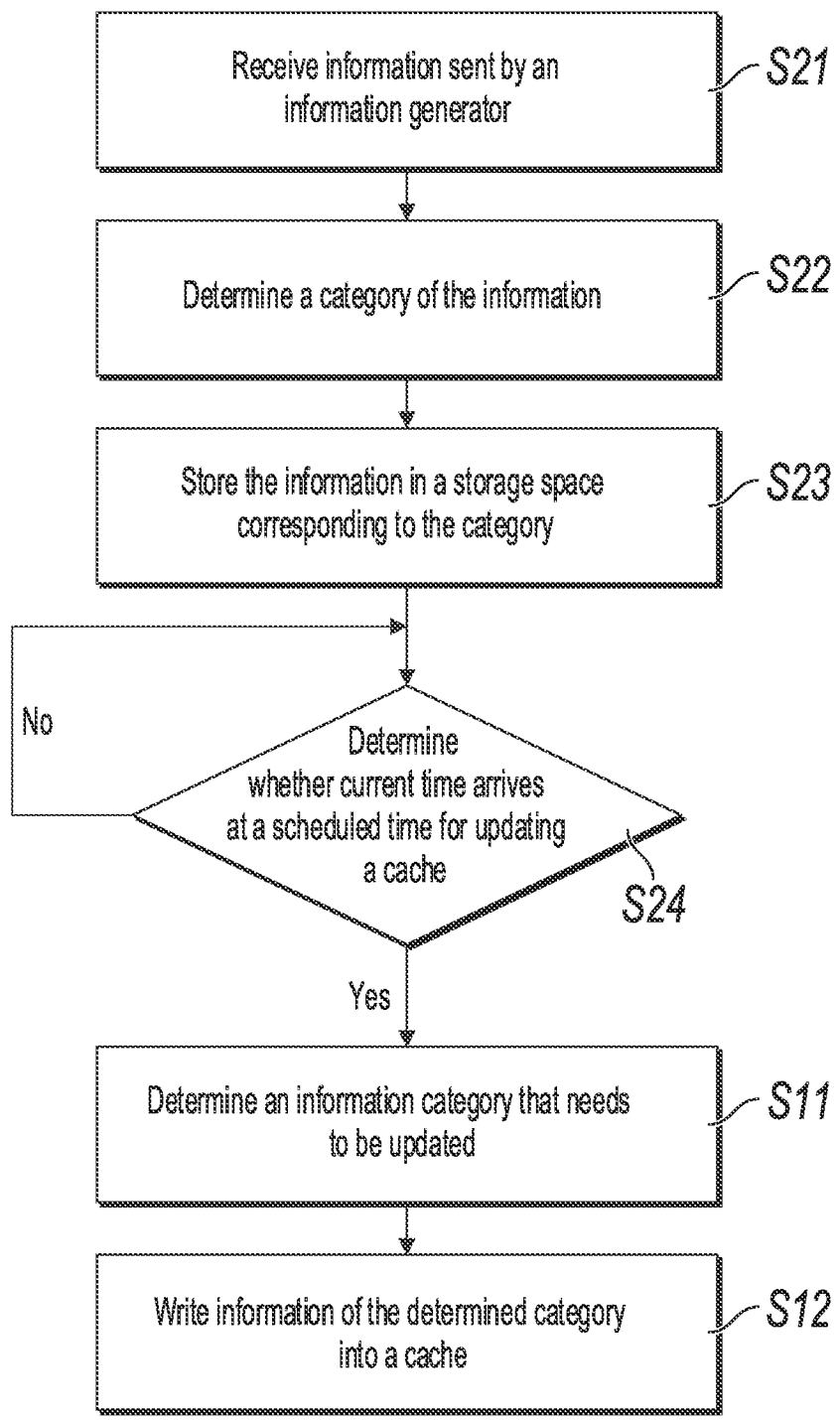
FIG. 2 is a schematic flowchart illustrating an information processing method, according to another implementation of the present application.

In some implementations, referring to FIG. 2, before S11, the method can further include the following step:

S21. Receive information sent by an information generator.

Assume that an execution body in the present implementation is referred to as a processing module, and a unification module can be disposed between the processing module and the information generator. The unification module receives the information generated by the information generator and sends the information to the processing module.

Therefore, the present step can be receiving the information sent by the information generator by using the unification module.

The quantity of unification modules is not limited to one. Different unification modules can be used based on different information categories. For example, information generated by a front end (such as a page) is sent to the processing module by using one unification module, and information generated by a back end (such as a transaction server) is sent to the processing module by using another unification module.

After generating the information, each information generator sends its generated information to the same unification module so as to avoid direct dependency between information generators that have a dependent relationship, thereby facilitating extension. For example, if there is a dependent relationship between an information generator A and an information generator B, and there is no unification module, the information generator A and the information generator B need to be directly connected, which causes a limitation. However, if both the information generator A and the information generator B are connected to the unification module, such a limitation can be avoided.

In some implementations, the received information can be information of a predetermined category so as to perform processing, which is provided in the present implementation, on the information of the predetermined category.

Alternatively, in some implementations, after the information is received in S21, it is determined whether the information is the information of the predetermined category so as to perform S22 and subsequent steps when the information is the information of the predetermined category.

Further, the previously described information of the predetermined category can be dynamic information, and the dynamic information is information that varies dynamically over time. The dynamic information can be further classified into different categories, such as browsing information, social information, or transaction information. Dynamic information of a certain project is used as an example. For example, the browsing information indicates that user A browses through the project; for example, the social information indicates that user A makes a comment on the project or user A clicks the like icon of the project; and for example, the transaction information indicates how much money user A invests in the project.

S22. Determine a category of the information.

S23. Store the information in a storage space corresponding to the category.

Figure 3:
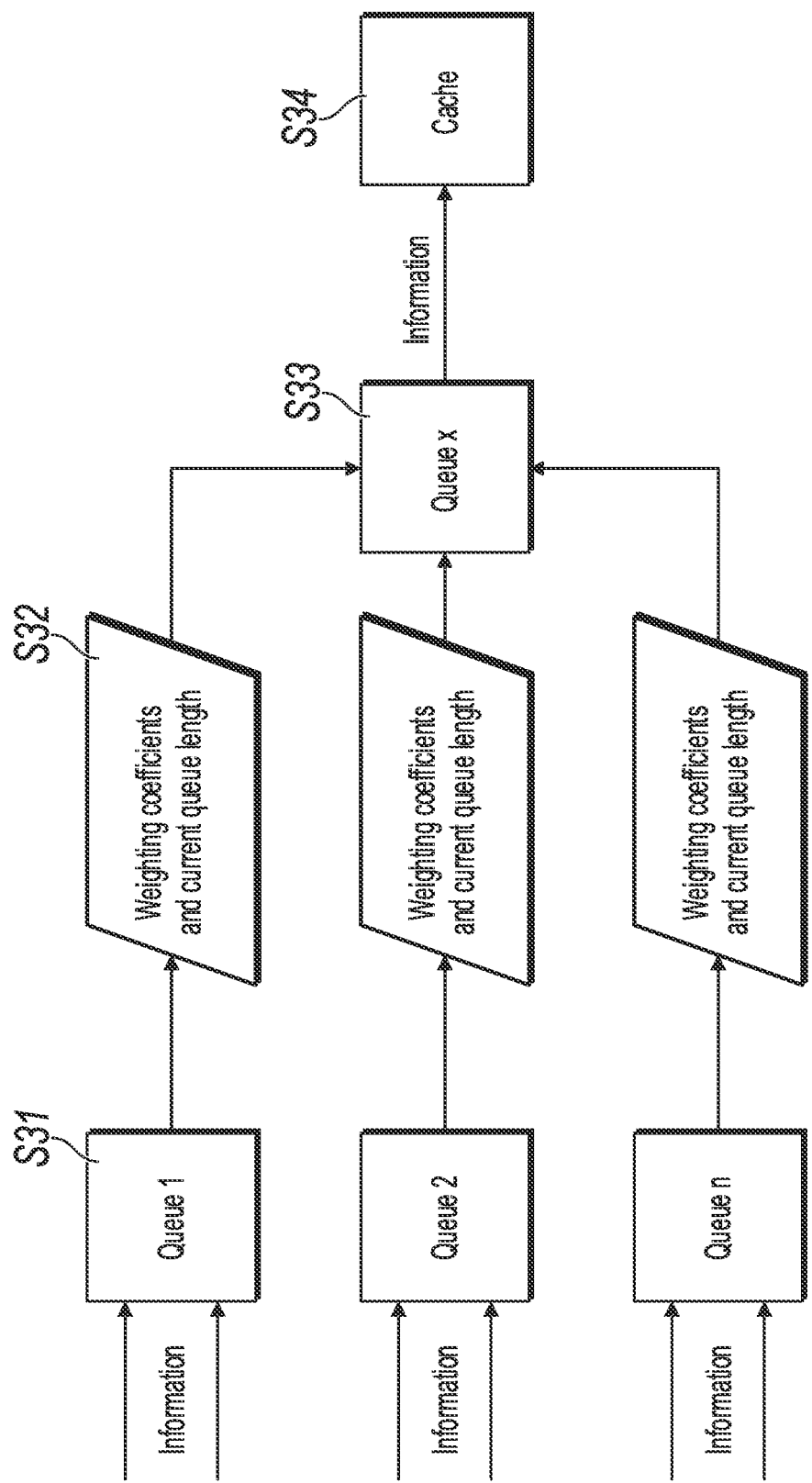
FIG. 3 is a schematic flowchart illustrating an information processing method, according to still another implementation of the present application.

Referring to FIG. 3, the processing module can create a queue locally. The queue can be initially set to be empty. After receiving the information, the processing module can store the information in the created queue. Specifically, information of different categories can be stored in different queues (S31) based on the information categories.

For example, the information can be classified as the browsing information, the social information, and the transaction information. Three queues can be created: a browsing queue, a social queue, and a transaction queue. After the information is received, the information is stored in a queue of a corresponding category. For example, when the browsing information is received, the browsing information is stored in the browsing queue; when the social information is received, the social information is stored in the social queue; and when the transaction information is received, the transaction information is stored in the transaction queue.

Further, the maximum length of each queue can be set.

Maximum lengths of different queues can be the same or different.

For example, the maximum length of a queue can be related to information stored in the queue. Specifically, the maximum length of the queue can have a positive correlation with value of the stored information. For example, a larger value of the information stored in the queue indicates a greater maximum length of the queue. A value of each type of information can be determined based on an actual need.

For example, maximum lengths of the browsing queue, the social queue, and the transaction queue are respectively 1, 5, and 10, and if a piece of information needs to be stored in one queue and a current queue length reaches the maximum length (the queue is full), information that is stored for the longest time can be deleted, and the latest information is stored in the queue.

The current queue length can be obtained by detecting a current status of the queue. For example, a counter can be disposed in the processing module, and the counter is configured to collect statistics of an amount of information stored in each queue so as to obtain the current queue length. For example, if one piece of browsing information is currently stored in the browsing queue, it is determined that a current queue length of the browsing queue is 1.

Next, referring to FIG. 2, before S11, the method can further include the following step:

S24. Determine whether current time arrives at a scheduled time for updating the cache; and if yes, perform S11 and subsequent steps; otherwise, repeat S24 and subsequent steps.

The cache can be set to be periodically updated. When the current time arrives at a preset update time, a corresponding category can be determined, and information of the determined category can be written into the cache.

As shown in FIG. 3, a procedure of determining the information category that needs to be updated can include the following step:

S32. Obtain weighting coefficients of each queue and a current queue length.

The weighting coefficients can include a popularity value and/or a manual intervention value.

The popularity value can be obtained by collecting popularity statistics of information stored in the queue. For example, a popularity value of the browsing queue is a popularity value of the browsing information, and a popularity value of the social queue is a popularity value of the social information, etc. A popularity value of one information category can be a total number of times it appears in an observation time window. Therefore, when the information category more frequently appears, popularity values of the information category and a corresponding queue are greater.

The manual intervention value is manually set. A manual intervention value of each queue can be set based on a demand. For example, if information of a certain category is more valuable, manual intervention values of the information category and a corresponding queue are set to be greater. For example, the social information is more valuable than the browsing information, therefore, a manual intervention value of the social queue can be set to be greater than a manual intervention value of the browsing queue.

The current queue length can be obtained by counting the length of each queue by using the disposed counter.

S33. Determine a queue from the queues based on the weighting coefficients and the current queue length.

For each queue, a product of the weighting coefficients (such as the popularity value and the manual intervention value) and the current queue length can be calculated, and a queue with the largest product value is selected.

Further, when there is one queue with the largest product value, the queue with the largest product value is determined as the selected queue.

Alternatively, if there are a plurality of queues with the largest product values, one queue is further selected from the plurality of queues with the largest product values based on a predetermined algorithm. For example, the predetermined algorithm is to perform selection based on the manual intervention value. Assume that the queues with the largest product values include a queue A and a queue B. If a manual intervention value of the queue A is greater than a manual intervention value of the queue B, it is determined that the selected queue is the queue A.

It can be understood that, when being manually set, different intervention values need to be respectively set for the queues.

After the queue is selected, the information can be read from the queue and written into the cache.

As shown in FIG. 3, a procedure of reading the information from the queue and writing the information into the cache can include the following step:

S34. Write, into the cache, one piece of information that currently exists and is stored for the longest time in the determined queue.

When the information is read from the queue, a first-in-first-out rule is followed.

In addition, when the information is written into the cache, the cache can store only several pieces of latest information.

In the present implementation, the information category that needs to be updated is determined, and the information of the determined category is written into the cache, so that highly valuable information can be selected and written into the cache. When reading information from the cache and displaying the information, the user interface can display the highly valuable information. Further, instead of writing the information into the cache directly when the information is generated, the information is read and written into the cache only when the cache needs to be updated, so that a quantity of writing times can be reduced, thereby reducing writing pressure of the cache and improving cache performance. Further, information sent by the information generator is stored, so that information precipitation can be implemented and data support can be provided for a related procedure.

When the previously described information caching method is applied to a scenario of processing dynamic information of a financial project, the present application can further provide the following implementation.

Figure 4:
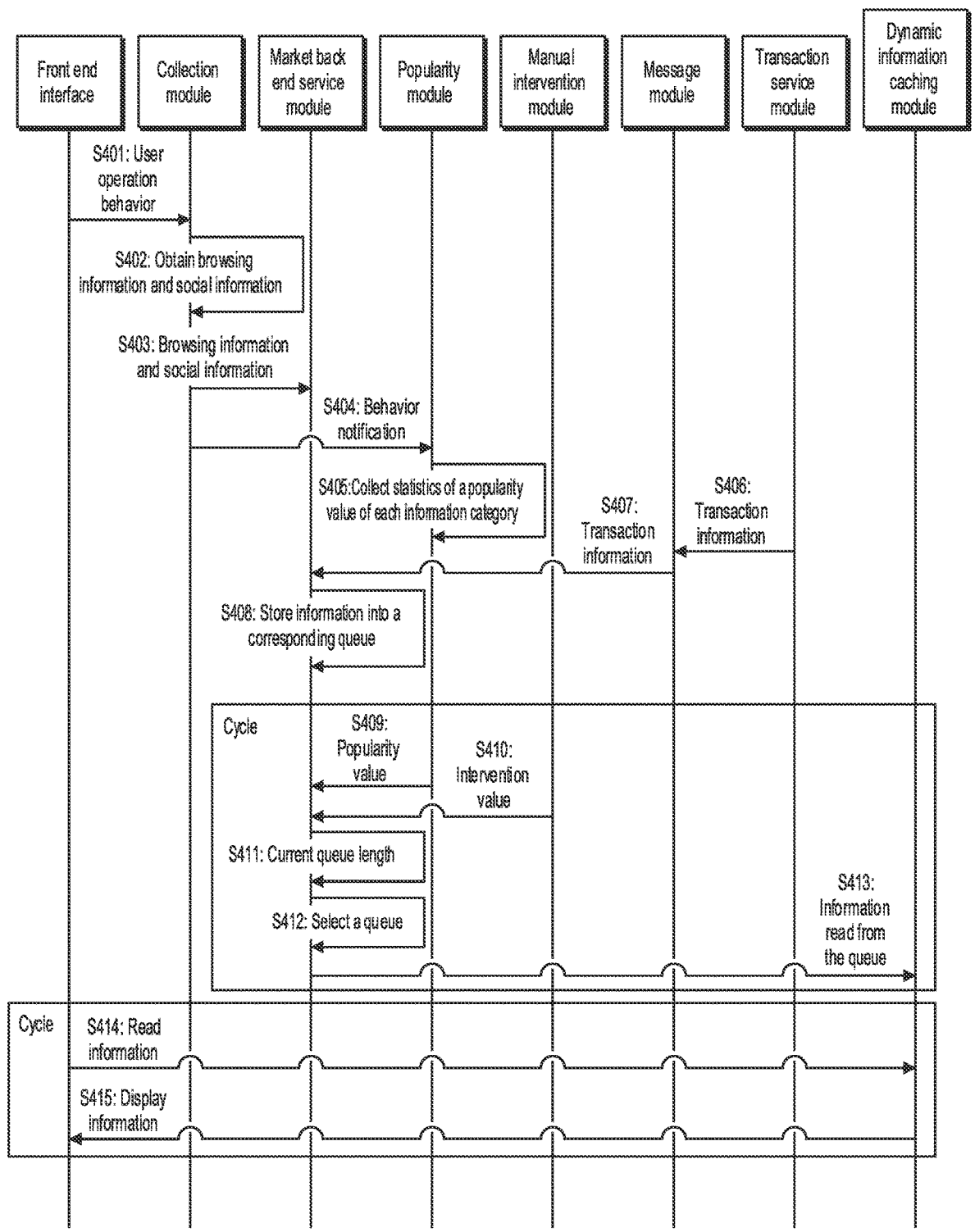
FIG. 4 is a schematic flowchart illustrating an information processing method, according to yet another implementation of the present application.
Figure 5:
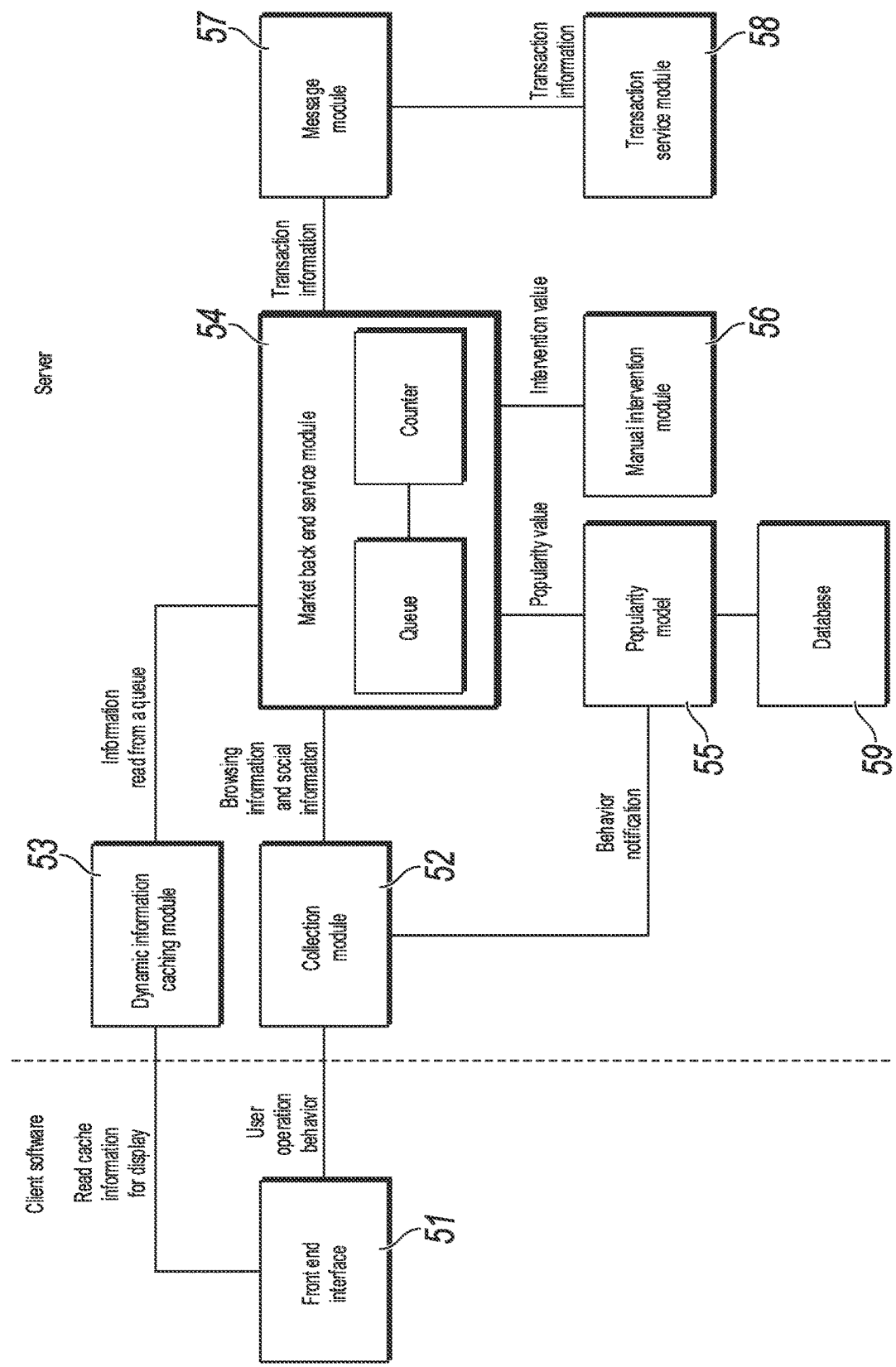
FIG. 5 is a schematic structural diagram of a processing system corresponding to FIG. 4.

FIG. 4 is a schematic flowchart illustrating an information processing method, according to yet another implementation of the present application. FIG. 5 is a schematic structural diagram of a processing system corresponding to FIG. 4.

As shown in FIG. 5, the previously described processing system includes the following: a front end interface 51, a collection module 52, a dynamic information caching module 53, a market back end service module 54, a popularity model 55, a manual intervention module 56, a message module 57, a transaction service module 58, and a database 59.

As shown in FIG. 5, the front end interface is located in client software, and the other modules are located in a server. It is worthwhile to note that in FIG. 5, the collection module is located in the server, but the collection module can alternatively be located in the client software too.

Descriptions of each module are as follows:

The front end interface is an interface viewed by the user after entering the system, operations of the user are implemented by using the front end interface, and the front end interface can be referred to as the user interface.

The collection module is configured to detect operation behavior (such as a clicking behavior and a searching behavior) of the user on the front end interface, and send the operation behavior to the market back end service module and the popularity model.

The dynamic information caching module is configured to set a cache list for each financial project (project for short), where each cache list stores dynamic information that needs to be displayed in the project.

The market back end service module is configured to process information sent by the collection module and the message module, perform weight calculation in combination with the popularity model and manual intervention module, and update the dynamic information in the cache.

The popularity model is used to analyze selecting popularity and searching information of the user, and provide a popularity value of each information category.

The manual intervention module is used by a back end administrator to set an intervention value for each information category.

The message module is responsible for distributing transaction messages of the transaction service module.

The database is used to store the information. For example, after receiving the information sent by the collection module, the popularity model can store the information in the database; and when the popularity model needs to calculate the popularity value, the popularity model obtains the information from the database, and calculates the popularity value.

Referring to FIG. 4, a procedure of interaction between the previously described modules includes the following steps.

S401. A front end interface detects a user operation behavior of a user on a project, and sends the user operation behavior to a collection module.

After the user opens a page of the project, the user can perform operations such as browsing, clicking the like icon, commenting, sharing, making transaction, and searching on the project. Correspondingly, the front end interface can detect corresponding specific user operation behavior, for example, a browsing behavior (detected clicking on the project), a social behavior (including clicking the like icon, comment, sharing, etc.), and a searching behavior.

S402. The collection module obtains, based on the user operation behavior sent by the front end interface, dynamic information that is independent of a back end service, such as browsing information and social information.

The dynamic information can be classified into information that is dependent on the back end service and the information that is independent of the back end service. For example, the information that is dependent on the back end service includes the transaction information. For example, the information that is independent of the back end service includes the browsing information and the social information.

In the present implementation, the information that is dependent on the back end service is the transaction information, and the information that is independent of the back end service is the browsing information and the social information.

Therefore, when the user operation behavior is a browsing behavior or a social behavior, corresponding browsing information and social information can be obtained.

S403. The collection module sends the browsing information and the social information to the market back end service module.

For example, the browsing information indicates that user A has performed browsing and user B has performed browsing.

For example, the social information indicates what user A says and what user B says; and/or indicates that user A clicks the like icon, user B clicks the like icon, etc.

S404. The collection module notifies a popularity model of the user operation behavior.

For example, when the user performs a browsing behavior on the front end interface once, the collection module sends, to the popularity model, a notification message that the browsing behavior is currently performed once.

S405. The popularity model collects statistics of the popularity value of each information category based on the notification message.

For example, a counter can be disposed in the popularity model, an initial value of the counter is 0, and when one notification message of one behavior is received, a popularity value of information corresponding to the behavior is increased by 1.

For example, the popularity model increases the popularity value of the browsing information by 1 each time the user performs the browsing behavior. The popularity model increases the popularity value of the social information by 1 each time the user performs the social behavior. The popularity model increases the popularity value of the transaction information by 1 each time the user performs the transaction behavior.

It can be understood that, when performing the previous statistics collection, the popularity model correspondingly performs statistics collection on users of each project. For example, popularity values of the browsing information of a project A are popularity values generated for users who browse through the project A.

Further, the previously described browsing can include viewing pages of the same project. Social behavior mainly includes behavior generated when the user clicks the like icons of these social blocks, makes comments on these social blocks, and shares these social blocks. Transactions mainly include ongoing transactions and conducted transactions of the users.

In addition, in the present implementation, browsing, a social behavior, and the transaction are used as an example, and searching can be further included.

Further, the searching can include direct searching and indirect searching. For example, in the system, a project name is "Zero Carbon Technology", and the user directly searches for "Zero Carbon Technology" in a search box is direct searching of the project; or when the user enters "environment protection" in the search box, and the collection module matches the search with "Zero Carbon Technology" based on a matching rule, this is indirect searching of the project.

S406. The transaction service module sends the transaction information to the message module.

S407. The message module sends the transaction information to the market back end service module.

S408. The market back end service module stores the received information into a queue of a corresponding category.

For example, the browsing information is stored in a browsing queue, the social information is stored in the social queue, and the transaction information is stored in a transaction queue.

In the previously described procedure, the information generator can send the information to the market back end service module by using the collection module or the message module.

The market back end service module stores the information into the queue so as to implement information precipitation. In addition, the information can be stored in different queues based on information categories so as to select highly valuable information.

When current time arrives at each scheduled time for updating the cache, for example, a second for updating the cache once, S409 to S413 can be cyclically performed per second.

S409. The market back end service module obtains the popularity value from the popularity model.

S410. The market back end service module obtains the manual intervention value from the manual intervention module.

S411. The market back end service module obtains a current queue length of each queue from the counter.

S412. The market back end service module calculates the product of the popularity value, the manual intervention value, and the current queue length of each queue, and selects a queue with the largest product value.

S413. Read one piece of information from the selected queue into the dynamic information caching module.

Further, when the front end interface needs to display the information, the front end interface can read the information from the cache and display the information.

The front end interface can display the information by performing updating at the scheduled time, and S414 and S415 can be cyclically performed when the current time arrives at a scheduled time for performing updating and displaying, or when an operation of triggering an update instruction by the user is received.

S414. The front end interface reads the information from the cache.

S415. The front end interface displays the read information.

It can be understood that, for a part not covered in the present implementation, reference can be made to related descriptions in the previously described implementation. Details are omitted here for simplicity.

In the present implementation, when the current time arrives at the time for updating the cache, the information is written into the cache, so that writing pressure of the cache can be reduced. The queue is selected based on the product of the popularity value, the manual intervention value, and the current queue length, and the information is read from the selected queue, so that highly valuable information can be written into the cache to display the highly valuable information, thereby avoiding a case in which the social information and the transaction information are submerged by the browsing information. The dynamic information is stored in the queue, so that information precipitation can be implemented and data support can be provided for another procedure. Forwarding the transaction message by using the message module can avoid a limitation caused by dependency between different services.

Figure 6:
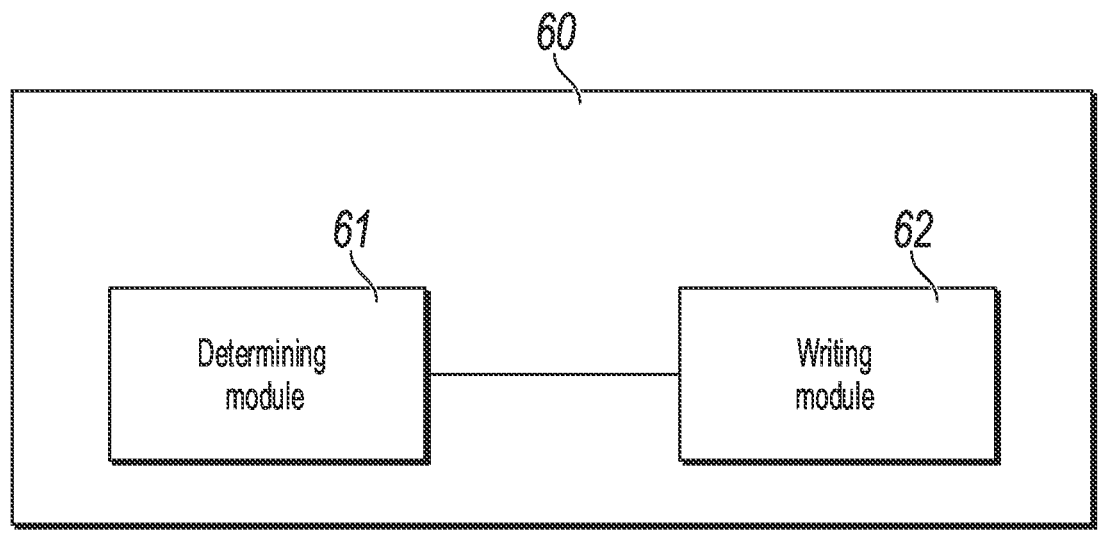
FIG. 6 is a schematic structural diagram illustrating an information processing device, according to an implementation of the present application.

FIG. 6 is a schematic structural diagram illustrating an information processing device, according to an implementation of the present application.

Referring to FIG. 6, a device 60 in the present implementation includes a determining module 61 and a writing module 62.

The determining module 61 is configured to determine an information category that needs to be updated.

The writing module 62 is configured to write the information of the determined category into a cache.

After being received, the information of the category is stored in a storage space corresponding to the category based on the category of the information.

Figure 7:
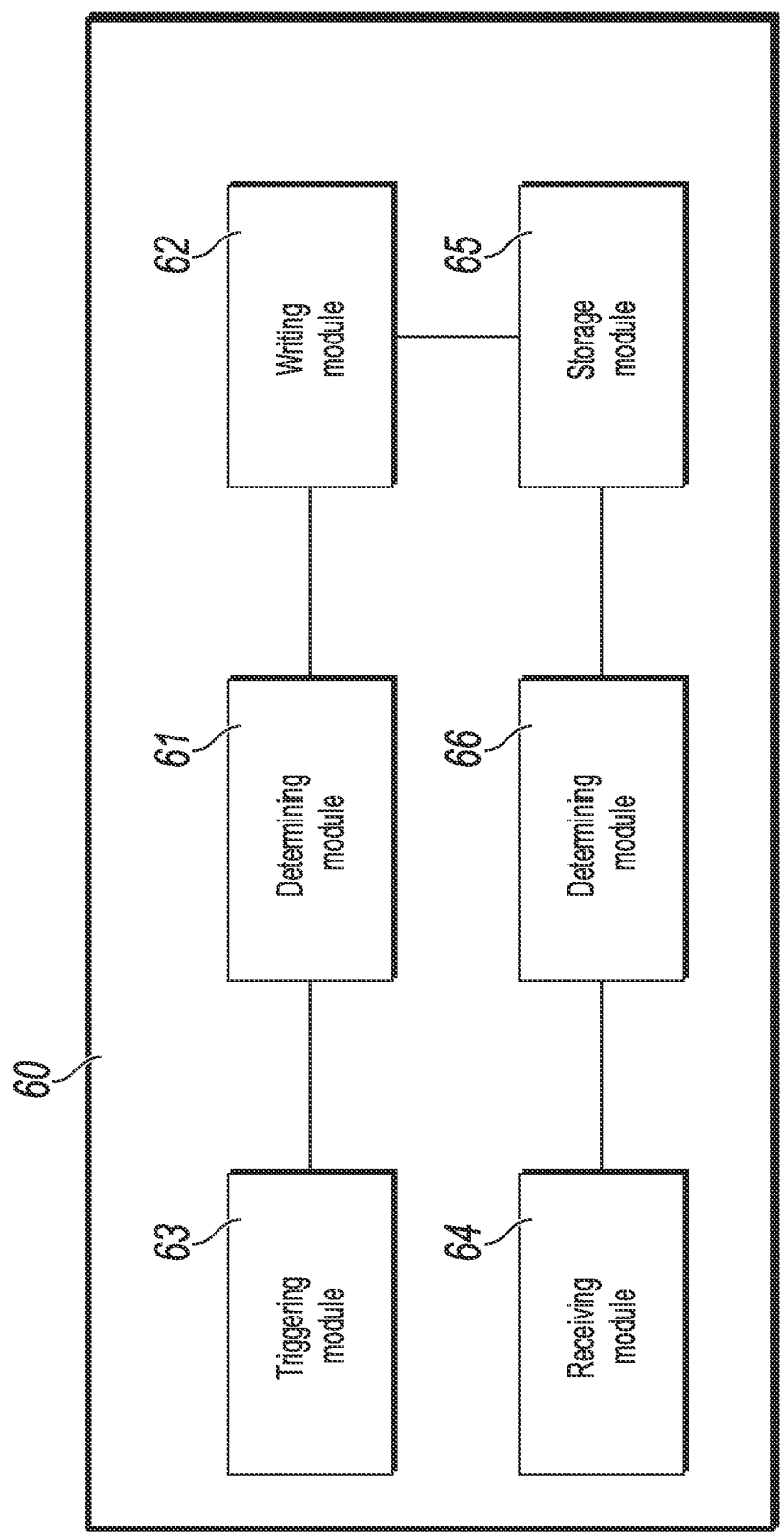
FIG. 7 is a schematic structural diagram illustrating an information processing device, according to an implementation of the present application.

In some implementations, referring to FIG. 7, the device 60 can further include a triggering module 63, configured to determine whether current time arrives at a scheduled time for updating the cache so as to trigger, when the current time arrives at the scheduled time, the determining module to perform execution.

In some implementations, referring to FIG. 7, the device 60 can further include a receiving module 64, configured to receive information sent by an information generator; and a storage module 65, configured to determine a category of the information, and store the information in a storage space corresponding to the category.

In some implementations, referring to FIG. 7, the device 60 can further include a determining module 66, configured to determine whether the information is information of a predetermined category so as to trigger, when the information is the information of the predetermined category, the storage module to perform execution.

In some implementations, the storage module 65 is configured to store different categories of information in different queues.

In some implementations, the determining module 61 is configured to obtain weighting coefficients of each queue and a current queue length; and determine a queue from the queues based on the weighting coefficients and the current queue length.

In some implementations, the weighting coefficients include a popularity value and/or a manual intervention value, the popularity value is a popularity value of information stored in the queue, and the popularity value of the information is obtained after popularity statistics of operation behavior that is of users and that corresponds to the information are collected.

In some implementations, maximum lengths of the different queues are related to stored information.

In some implementations, the determining a queue from the queues based on the weighting coefficients and the current queue length includes calculating a product of the weighting coefficients and the current queue length, and selecting a queue with the largest product value from the queues; and if there is one queue with the largest product value, using the queue with the largest product value as the determined queue; or if there is more than one queue with the largest product value, determining one queue from a plurality of queues with the largest product values based on a predetermined algorithm.

In some implementations, the writing module 62 is configured to write, into the cache, one piece of information that currently exists and is stored for the longest time in the determined category.

In some implementations, the receiving module 64 is configured to receive information sent by an information generator by using a unification module, where when information of the same category is generated by a plurality of information generators, the plurality of information generators are connected to the unification module.

In some implementations, the information of the predetermined category is dynamic information.

It can be understood that the device in the present implementation corresponds to the previously described method implementation. For details, reference can be made to the previously described related descriptions. Details are omitted here for simplicity.

In the present implementation, the category is selected, and the information is read from the selected category and written into the cache, so that highly valuable information can be selected and written into the cache. When reading information from the cache and displaying the information, the user interface can display the highly valuable information. Further, instead of writing the information into the cache directly when the information is generated, the information is read and written into the cache only when the current time arrives at the scheduled time for updating the cache, so that a quantity of writing times can be reduced, thereby reducing writing pressure of the cache and improving cache performance. Further, information sent by the information generator is stored, so that information precipitation can be implemented and data support can be provided for a related procedure.

Figure 8:
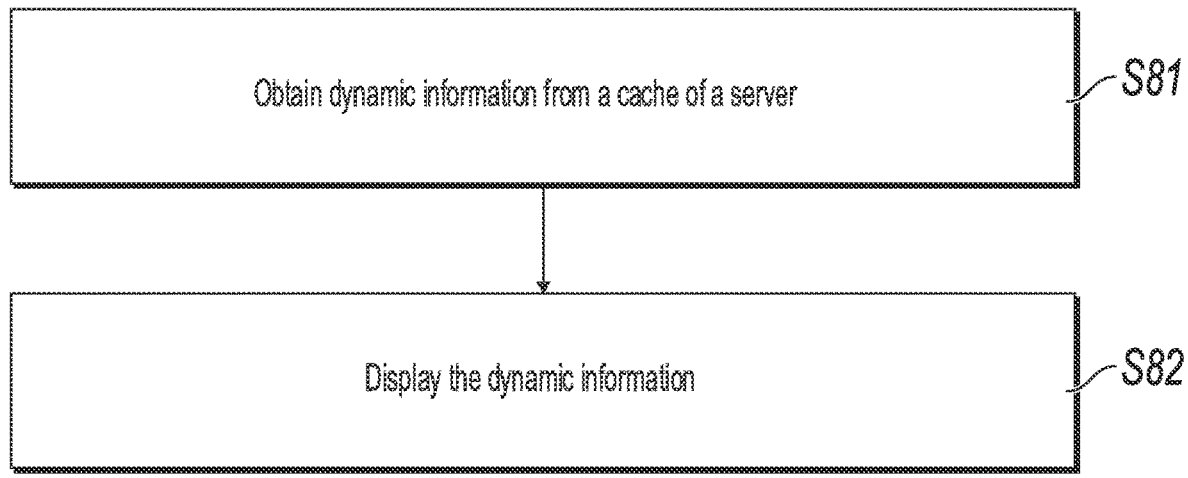
FIG. 8 is a schematic flowchart illustrating a method for displaying dynamic information, according to an implementation of the present application.

FIG. 8 is a schematic flowchart illustrating a method for displaying dynamic information, according to an implementation of the present application.

Referring to FIG. 8, a procedure in the present implementation includes the following steps:

S81. Obtain dynamic information from a cache of a server.

S82. Display the dynamic information.

The dynamic information is related to an information category.

When a solution that is in related technologies and in which the dynamic information is written into the cache directly after the dynamic information is generated is used, the dynamic information is related to a generation time, and therefore, the displayed dynamic information is the latest dynamic information.

In the present implementation, the previously described dynamic information is related to the information category, and therefore, the displayed dynamic information belongs to information in the needed category. For example, a user prefers to see the transaction information, and more displayed dynamic information is the transaction information.

Specifically, to correlate the dynamic information with the information category, the dynamic information can be written into the cache by using related content in the previously described implementation.

Specifically, for the dynamic information and a procedure of processing the dynamic information by the server, reference can be made to the previously described implementation. Details are omitted here for simplicity.

In some implementations, the method can further include obtaining static information from a database of the server.

For example, the static information includes information corresponding to fixed content of a web page, such as a specific name, a picture, and related description information of a certain financial project.

In some implementations, the method can further include sending the generated dynamic information to the server.

For example, client software can further generate dynamic information such as browsing information and social information. After generating such information, the client software can send the information to the server. Correspondingly, after receiving the dynamic information, the server can classify the dynamic information for storage.

It can be understood that, for details in the present implementation, reference can be made to related descriptions in the previously described implementation. Details are omitted here for simplicity.

Figure 9:
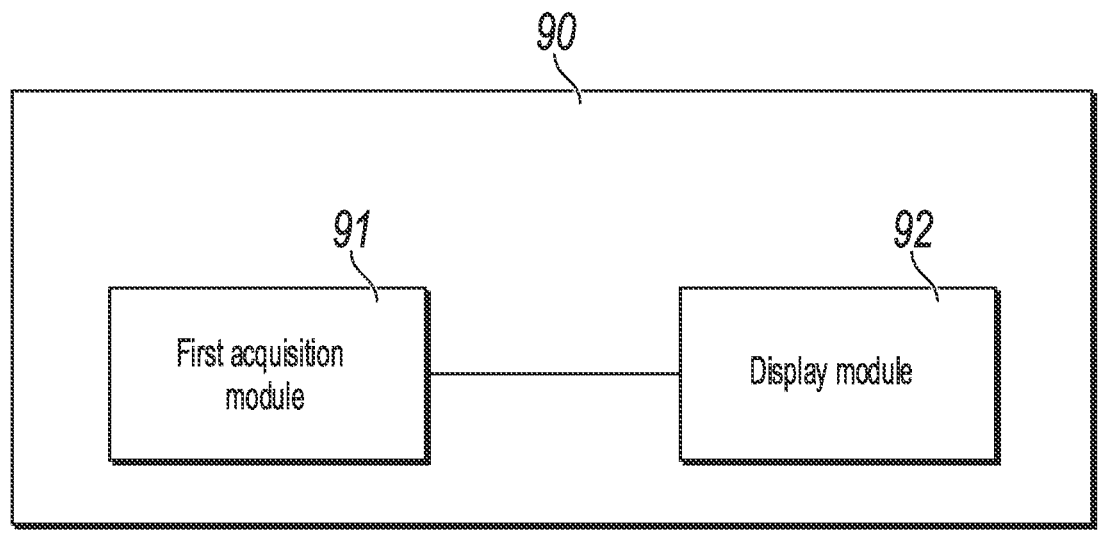
FIG. 9 is a schematic structural diagram illustrating a device for displaying dynamic information, according to an implementation of the present application.

FIG. 9 is a schematic structural diagram illustrating a device for displaying dynamic information, according to an implementation of the present application.

Referring to FIG. 9, a device 90 in the present implementation includes a first acquisition module 91 and a display module 92.

The first acquisition module 91 is configured to obtain dynamic information from a cache of a server.

The display module 92 is configured to display the dynamic information.

The dynamic information is related to an information category.

Figure 10:
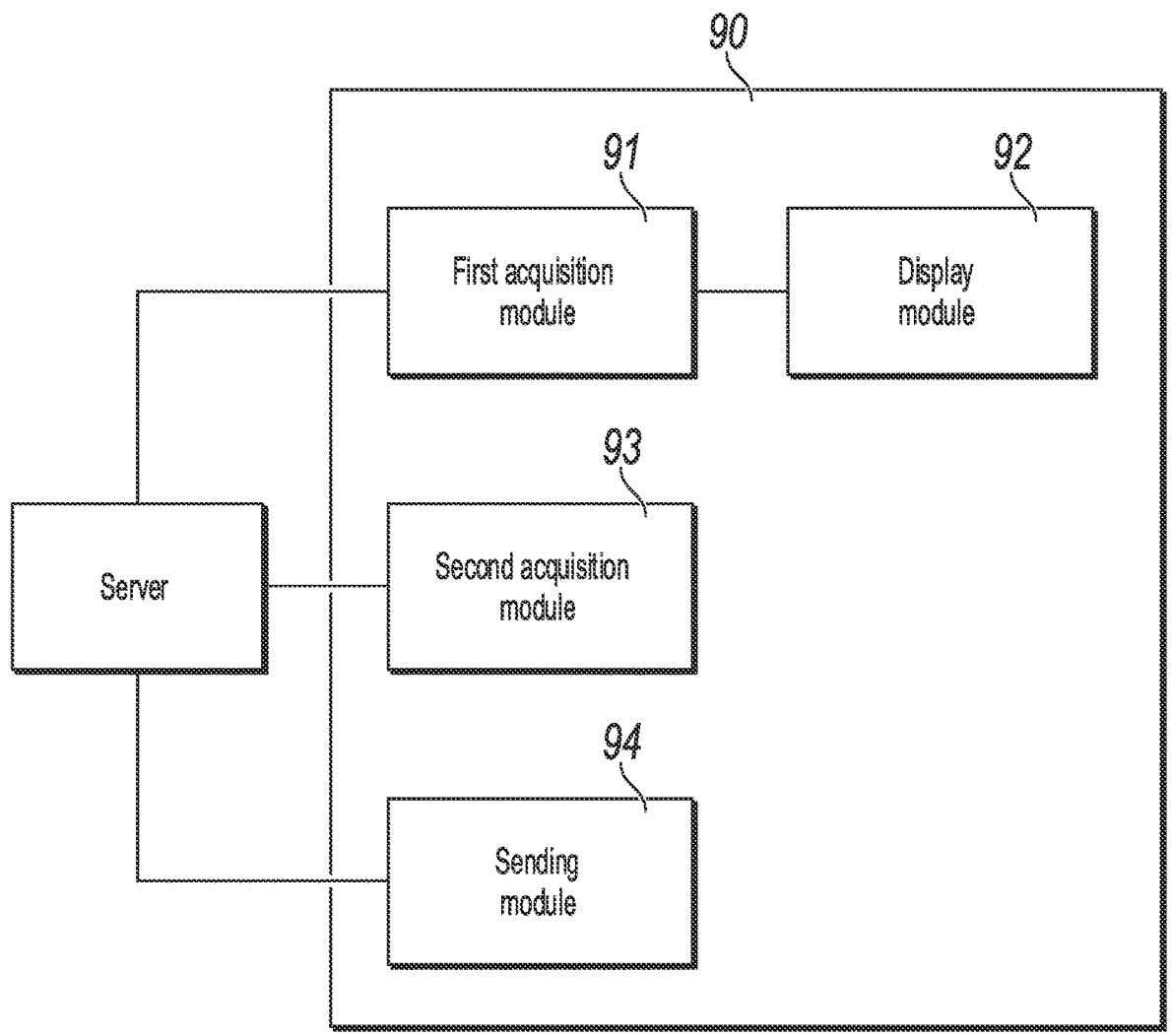
FIG. 10 is a schematic structural diagram illustrating a device for displaying dynamic information, according to another implementation of the present application.

In some implementations, referring to FIG. 10, the device 90 further includes a second acquisition module 93, configured to obtain static information from a database of the server.

In some implementations, referring to FIG. 10, the device 90 further includes a sending module 94, configured to send the generated dynamic information to the server.

It can be understood that the device in the present implementation corresponds to the previously described method implementation. For details, reference can be made to the previously described related descriptions. Details are omitted here for simplicity.

In the present implementation, the dynamic information is displayed, and the dynamic information is related to the information category, so that highly valuable information can be displayed.

The present application further provides an information processing device. The device includes a processor and a memory. The memory is configured to store an instruction that can be executed by the processor. The processor is configured to determine an information category that needs to be updated; and write information of the determined category into a cache, where after being received, the information of the category is stored in a storage space corresponding to the category based on the category of the information.

In some implementations, the processor is further configured to determine whether current time arrives at a scheduled time for updating the cache so as to perform, when the current time arrives at the scheduled time, the step of determining the information category that needs to be updated.

In some implementations, the processor is further configured to receive information sent by an information generator; determine a category of the information; and store the information in a storage space corresponding to the category.

In some implementations, after the receiving information sent by an information generator, the method further includes determining whether the information is information of a predetermined category so as to perform, when the information is the information of the predetermined category, the step of determining the category of the information.

In some implementations, the storing the information in a storage space corresponding to the category includes storing different categories of information in different queues.

In some implementations, the determining an information category that needs to be updated includes obtaining weighting coefficients of each queue and a current queue length; and determining a queue from the queues based on the weighting coefficients and the current queue length.

In some implementations, the weighting coefficients include a popularity value and/or a manual intervention value. The popularity value is a popularity value of information stored in the queue, and the popularity value of the information is obtained after popularity statistics of operation behavior that is of users and that corresponds to the information are collected.

In some implementations, maximum lengths of the different queues are related to stored information.

In some implementations, the determining a queue from the queues based on the weighting coefficients and the current queue length includes calculating a product of the weighting coefficients and the current queue length, and selecting a queue with the largest product value from the queues; and if there is one queue with the largest product value, using the queue with the largest product value as the determined queue; or if there is more than one queue with the largest product value, determining one queue from a plurality of queues with the largest product values based on a predetermined algorithm.

In some implementations, the writing information of the determined category into a cache includes writing, into the cache, one piece of information that currently exists and is stored for the longest time in the determined category.

In some implementations, the receiving information sent by an information generator includes receiving the information sent by the information generator by using a unification module, where when information of the same category is generated by a plurality of information generators, the plurality of information generators are connected to the unification module.

In some implementations, the information of the predetermined category is dynamic information.

It can be understood that the present implementation corresponds to the previously described implementation of the information processing method. For details, reference can be made to related descriptions in the previously described implementation. Details are omitted here for simplicity.

The present application further provides a device for displaying dynamic information. The device includes a processor and a memory. The memory is configured to store an instruction that can be executed by the processor. The processor is configured to obtain the dynamic information from a cache of a server; and display the dynamic information, where the dynamic information is related to an information category.

In some implementations, the processor is further configured to send the generated dynamic information to the server.

In some implementations, the processor is further configured to obtain static information from a database of the server.

It can be understood that the present implementation corresponds to the previously described implementation of the method for displaying dynamic information. For details, reference can be made to related descriptions in the previously described implementation. Details are omitted here for simplicity.

The present application further provides an information processing system, including a collection device, configured to receive dynamic information generated by a front end interface; a message device, configured to receive dynamic information generated by a back end server; a service device, configured to receive the dynamic information sent by the collection module and the dynamic information sent by the message module, store the dynamic information in a storage space corresponding to a category based on the category that includes the dynamic information, and write the dynamic information of the determined category into the cache when the cache needs to be updated; and a caching device, configured to receive the dynamic information written by the service module.

In some implementations, the system further includes a front end interface device, configured to send the generated dynamic information to the collection module; and when the dynamic information needs to be displayed, obtain the dynamic information from the caching device for display.

In some implementations, the service device is configured to store different categories of dynamic information in different queues; when the cache needs to be updated, obtain weighting coefficients of each queue and a current queue length, and determine a queue in the queues based on the weighting coefficients and the current queue length; and write, into the cache, one piece of information that currently exists and is stored for the longest time in the determined queue.

In some implementations, the weighting coefficients include a popularity value and a manual intervention value, and the system further includes a popularity model device, configured to calculate the popularity value; and a manual intervention device, configured to set the manual intervention value.

It can be understood that the collection device, the message device, the service device, the caching device, the front end interface device, the popularity model device, and the manual intervention device in the present implementation respectively correspond to the collection module, the message module, the market back end service module, the dynamic information caching module, the front end interface, the popularity model, and the manual intervention module in the previously described implementation. The back end server in the present implementation corresponds to the transaction service module in the previously described implementation. For details, reference can be made to related descriptions in the previously described implementation. Details are omitted here for simplicity.

It is worthwhile to note that in the descriptions of the present application, the terms "first" and "second" are merely used for description, and shall not be understood as an indication or implication of relative importance. In addition, in the descriptions of the present application, "a plurality of" means "at least two" unless otherwise stated.

Descriptions about any procedure or method described in a flowchart or in another method here can be understood as follows: one or more modules, segments, or parts of code of an executable instruction that is used to implement a specific logical function or procedure step are included; the scope of preferred implementations of the present application includes other implementations, and functions can be performed in a sequence other than the shown or discussed sequence, including a basically simultaneous method or a reverse sequence based on the concerned functions. This should be understood by a person skilled in the art that includes the implementations of the present application.

It should be understood that parts in the present application can be implemented by using hardware, software, firmware, or a combination of them. In the previously described implementations, a plurality of steps or methods can be implemented by using software or firmware that is stored in a memory and that is executed by an appropriate instruction execution system. For example, if hardware is used for implementation, same as another implementation, any one or a combination of the following well-known technologies in the art can be used for implementation: a discrete logic circuit having a logic gate circuit that is configured to implement a logical function for a data signal; an application-specific integrated circuit having an appropriate combined logic gate circuit; a programmable gate array (PGA); and a field programmable gate array (FPGA), etc.

A person of ordinary skill in the art can understand that some or all of the steps of the method in the previously described implementations can be implemented by a program instructing related hardware. The program can be stored in a computer readable storage medium. When the program runs, one or a combination of the steps of the method implementations is performed.

In addition, functional units in the implementations of the present application can be integrated into one processing module, or each of the units can physically exist, or two or more units can be integrated into one module. The integrated module can be implemented in a form of hardware or a form of a software functional module. When the integrated module is implemented in the form of a software functional module and sold or used as an independent product, the integrated module can also be stored in a computer readable storage medium.

The mentioned storage medium can be a read-only memory, a magnetic disk, an optical disk, etc.

In the descriptions of the present specification, reference terms such as "an implementation", "some implementations", "example", "specific example", and "some examples" mean that specific features, structures, materials, or characteristics described with reference to the implementations or examples are included in at least one implementation or example in the present application. In the present specification, the exemplary expressions of the terms do not necessarily indicate the same implementation or example. In addition, the described specific features, structures, materials, or characteristics can be combined in an appropriate method in any one or more of the implementations or examples.

Although the implementations of the present application are shown and described above, it can be understood that the previously described implementations are exemplary and cannot be construed as a limitation on the present application. Within the scope of the present application, a person of ordinary skill in the art can make changes, modifications, replacements, and variations for the previously described implementations.

Figure 11:
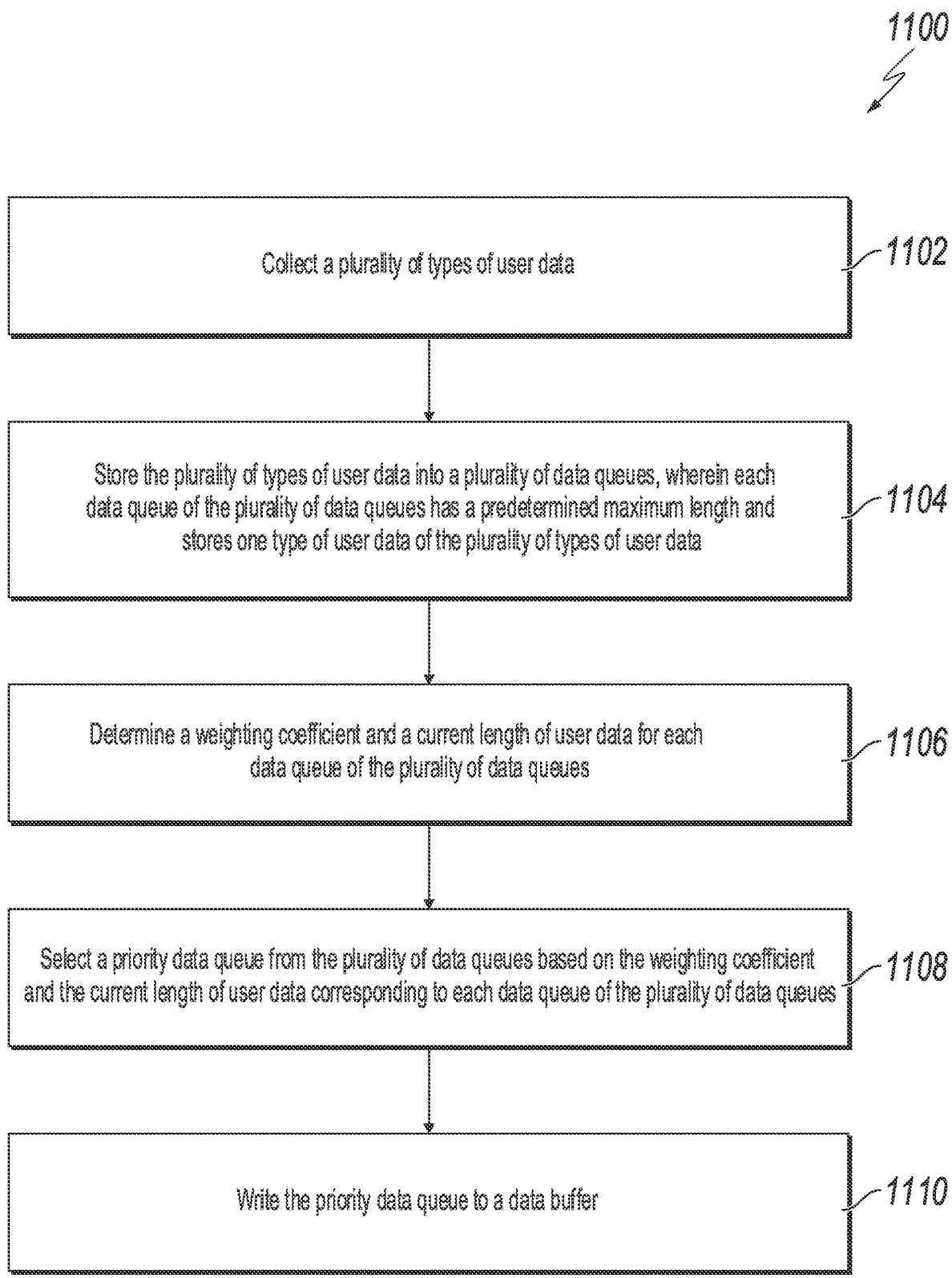
FIG. 11 is a flowchart illustrating an example of a computer-implemented method for determining and writing valuable user data to a data buffer, according to an implementation of the present disclosure.

FIG. 11 is a flowchart illustrating an example of a computer-implemented method 1100 for determining and writing valuable user data to a data buffer, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a plurality of types of user data are collected. In some implementations, the plurality of types of user data includes front-end user data and back-end user data, wherein the front-end user data includes at least one of browsing data, social media interaction data, or search data, and the back-end user data includes transaction data. From 1102, method 1100 proceeds to 1104.

At 1104, the plurality of types of user data are stored into a plurality of data queues, wherein each data queue of the plurality of data queues has a predetermined maximum length and stores one type of user data of the plurality of types of user data. In some implementations, a predetermined maximum length of a particular data queue is larger if a corresponding type of user data associated with the particular data queue has a higher information value. For example, transaction data can have higher information value than search data. Search data can have higher information value than browsing data. From 1104, method 1100 proceeds to 1106.

At 1106, a weighting coefficient and a current length of user data for each data queue of the plurality of data queues are determined. In some implementations, the weighting coefficient is determined based on at least one of a popularity value or an intervention value of a corresponding type of user data. In some implementations, the popularity value is determined based on an amount of the corresponding type of user data generated in a predetermined period of time, and the intervention value is determined (for example, manually) based on an information value of the corresponding type of user data. From 1106, method 1100 proceeds to 1108.

At 1108, a priority data queue is selected from the plurality of data queues based on the weighting coefficient and the current length of user data corresponding to each data queue of the plurality of data queues. In some implementations, based on a determination that the data buffer needs to be updated, the priority data queue is selected (for example, based on a predetermined data buffer update cycle). In some implementations, selection of the priority data queue from the plurality of data queues is based on multiplying the weighting coefficient and the current length of user data for each of the plurality of data queues and selecting, as the priority data queue, a data queue that has a largest multiplication value. From 1108, method 1100 proceeds to 1110.

At 1110, the priority data queue is written to a data buffer. From 1112, method 1100 proceeds to 1114.

Implementations of the subject matter described in this specification can be implemented so as to realize particular advantages or technical effects. For example, implementations of the subject matter permit a priority data to be written to a data buffer when the data buffer needs to be updated according to an update cycle. As such, the read and write operations to the buffer can be performed only periodically, which can reduce the load of the buffer. By arranging different types of user data into data queues and prioritizing writing user data with higher information value to the buffer, more valuable user data can be more efficiently accessed by a user.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    collecting a plurality of types of user data;
    storing the plurality of types of user data into a plurality of data queues, wherein each data queue of the plurality of data queues has a predetermined maximum length and stores one type of user data of the plurality of types of user data, and wherein the plurality of types of user data stored in the plurality of data queues is used to update data in a cache;
    determining that a current time is a scheduled time for updating the cache, wherein the cache is updated periodically;
    in response to determining that a current time is a scheduled time for updating the cache, determining a weighting coefficient and a current length of user data for each data queue of the plurality of data queues;
    selecting a priority data queue from the plurality of data queues based on the weighting coefficient and the current length of user data corresponding to each data queue of the plurality of data queues; and
    writing one or more pieces of user data stored in the priority data queue to the cache.

2. The computer-implemented method of claim 1, wherein the weighting coefficient is determined based on a popularity value of a corresponding type of user data, and the popularity value is determined based on an amount of the corresponding type of user data generated in a predetermined period of time.

3. The computer-implemented method of claim 1, wherein the weighting coefficient is determined based on a manual intervention value of a corresponding type of user data, the manual intervention value is set by a back end administrator, and the manual intervention value is determined based on an information value of the corresponding type of user data.

4. The computer-implemented method of claim 1, wherein the plurality of types of user data includes front-end user data and back-end user data, wherein the front-end user data includes at least one of browsing data, social media interaction data, or search data, and the back-end user data includes transaction data.

5. The computer-implemented method of claim 1, wherein selection of the priority data queue from the plurality of data queues is based on:
    multiplying the weighting coefficient and the current length of user data for each of the plurality of data queues; and
    selecting, as the priority data queue, a data queue that has a largest multiplication value.

6. The computer-implemented method of claim 1, wherein a predetermined maximum length of a particular data queue is larger if a corresponding type of user data associated with the particular data queue has a higher information value.

7. A non-transitory, computer-readable medium storing one or more instructions executable by a computer system to perform operations comprising:
    collecting a plurality of types of user data;
    storing the plurality of types of user data into a plurality of data queues, wherein each data queue of the plurality of data queues has a predetermined maximum length and stores one type of user data of the plurality of types of user data, and wherein the plurality of types of user data stored in the plurality of data queues is used to update data in a cache;
    determining that a current time is a scheduled time for updating the cache, wherein the cache is updated periodically;
    in response to determining that a current time is a scheduled time for updating the cache, determining a weighting coefficient and a current length of user data for each data queue of the plurality of data queues;
    selecting a priority data queue from the plurality of data queues based on the weighting coefficient and the current length of user data corresponding to each data queue of the plurality of data queues; and
    writing one or more pieces of user data stored in the priority data queue to the cache.

8. The non-transitory, computer-readable medium of claim 7, wherein the weighting coefficient is determined based on a popularity value of a corresponding type of user data, and the popularity value is determined based on an amount of the corresponding type of user data generated in a predetermined period of time.

9. The non-transitory, computer-readable medium of claim 7, wherein the weighting coefficient is determined based on a manual intervention value of a corresponding type of user data, the manual intervention value is set by a back end administrator, and the manual intervention value is determined based on an information value of the corresponding type of user data.

10. The non-transitory, computer-readable medium of claim 7, wherein the plurality of types of user data includes front-end user data and back-end user data, wherein the front-end user data includes at least one of browsing data, social media interaction data, or search data, and the back-end user data includes transaction data.

11. The non-transitory, computer-readable medium of claim 7, wherein selection of the priority data queue from the plurality of data queues is based on:
    multiplying the weighting coefficient and the current length of user data for each of the plurality of data queues; and
    selecting, as the priority data queue, a data queue that has a largest multiplication value.

12. The non-transitory, computer-readable medium of claim 7, wherein a predetermined maximum length of a particular data queue is larger if a corresponding type of user data associated with the particular data queue has a higher information value.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
collecting a plurality of types of user data;
storing the plurality of types of user data into a plurality of data queues, wherein each data queue of the plurality of data queues has a predetermined maximum length and stores one type of user data of the plurality of types of user data, and wherein the plurality of types of user data stored in the plurality of data queues is used to update data in a cache;
determining that a current time is a scheduled time for updating the cache, wherein the cache is updated periodically;
in response to determining that a current time is a scheduled time for updating the cache, determining a weighting coefficient and a current length of user data for each data queue of the plurality of data queues;
selecting a priority data queue from the plurality of data queues based on the weighting coefficient and the current length of user data corresponding to each data queue of the plurality of data queues; and
writing one or more pieces of user data stored in the priority data queue to the cache.

14. The computer-implemented system of claim 13, wherein the weighting coefficient is determined based on a popularity value of a corresponding type of user data, and the popularity value is determined based on an amount of the corresponding type of user data generated in a predetermined period of time.

15. The computer-implemented system of claim 13, wherein the plurality of types of user data includes front-end user data and back-end user data, wherein the front-end user data includes at least one of browsing data, social media interaction data, or search data, and the back-end user data includes transaction data.

16. The computer-implemented system of claim 13, wherein selection of the priority data queue from the plurality of data queues is based on:
multiplying the weighting coefficient and the current length of user data for each of the plurality of data queues; and
selecting, as the priority data queue, a data queue that has a largest multiplication value.

17. The computer-implemented system of claim 13, wherein a predetermined maximum length of a particular data queue is larger if a corresponding type of user data associated with the particular data queue has a higher information value.

18. The computer-implemented system of claim 13, wherein the weighting coefficient is determined based on a manual intervention value of a corresponding type of user data, the manual intervention value is set by a back end administrator, and the manual intervention value is determined based on an information value of the corresponding type of user data.

* * * * *